US011288578B2

(12) United States Patent
Wang et al.

(10) Patent No.: US 11,288,578 B2
(45) Date of Patent: Mar. 29, 2022

(54) CONTEXT-AWARE CONVERSATION THREAD DETECTION FOR COMMUNICATION SESSIONS

(71) Applicant: International Business Machines Corporation, Armonk, NY (US)

(72) Inventors: Dakuo Wang, Cambridge, MA (US); Ming Tan, Malden, MA (US); Mo Yu, White Plains, NY (US); Haoyu Wang, Somerville, MA (US); Yupeng Gao, Elmsford, NY (US); Chuang Gan, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 16/597,937

(22) Filed: Oct. 10, 2019

(65) Prior Publication Data

US 2021/0110266 A1 Apr. 15, 2021

(51) Int. Cl.
*G06N 3/08* (2006.01)
*G06N 20/00* (2019.01)
(Continued)

(52) U.S. Cl.
CPC ............ *G06N 3/082* (2013.01); *G06N 3/049* (2013.01); *G06N 20/00* (2019.01); *H04L 51/16* (2013.01); *H04L 51/22* (2013.01)

(58) Field of Classification Search
CPC ......... H04L 51/16; H04L 51/22; G06N 3/082; G06N 20/00; G06N 3/049
See application file for complete search history.

(56) References Cited

U.S. PATENT DOCUMENTS 7,590,603 B2 * 9/2009 Zhang .................. G06F 16/353
706/12
9,705,832 B2 * 7/2017 Waltermann ............ H04L 51/16
(Continued)

OTHER PUBLICATIONS

Shen, Dou, et al. "Thread detection in dynamic text message streams." Proceedings of the 29th annual international ACM SIGIR conference on Research and development in information retrieval. 2006. (Year: 2006).*

(Continued)

*Primary Examiner* — Caroline H Jahnige
(74) *Attorney, Agent, or Firm* — Edell, Shapiro & Finnan, LLC

(57) ABSTRACT

A computer system identifies threads in a communication session. A feature vector is generated for a message in a communication session, wherein the feature vector includes elements for features and contextual information of the message. The message feature vector and feature vectors for a plurality of threads are processed using machine learning models each associated with a corresponding thread to determine a set of probability values for classifying the message into at least one thread, wherein the threads include one or more pre-existing threads and a new thread. A classification of the message into at least one of the threads is indicated based on the set of probability values. Classification of one or more prior messages is adjusted based on the message's classification. Embodiments of the present invention further include a method and program product for identifying threads in a communication session in substantially the same manner described above.

15 Claims, 10 Drawing Sheets

(51) Int. Cl.
  *H04L 51/42* (2022.01)
  *H04L 51/00* (2022.01)
  *G06N 3/04* (2006.01)

(56) References Cited

U.S. PATENT DOCUMENTS

| | | | |
|---|---|---|---|
| 10,320,737 | B2 | 6/2019 | Silverman et al. |
| 10,346,166 | B2 | 7/2019 | Chen et al. |
| 10,348,658 | B2 | 7/2019 | Rodriguez et al. |
| 2017/0353414 | A1* | 12/2017 | Ertmann ................. H04L 51/32 |
| 2019/0080291 | A1 | 3/2019 | Staats |
| 2019/0096394 | A1 | 3/2019 | Ramachandra Iyer et al. |
| 2019/0121907 | A1* | 4/2019 | Brunn ................... G06F 16/353 |
| 2019/0171693 | A1* | 6/2019 | Dotan-Cohen ....... G06T 11/206 |

OTHER PUBLICATIONS

Mehri, Shikib, and Giuseppe Carenini. "Chat disentanglement: Identifying semantic reply relationships with random forests and recurrent neural networks." Proceedings of the Eighth International Joint Conference on Natural Language Processing (vol. 1: Long Papers). 2017. (Year: 2017).*

"Dynamic Context Aware Chatbot Interaction Mechanism", IP.com, Anonymously disclosed, IP.com No. IPCOM000258976D, Jun. 29, 2019, pp. 6.

D. Feng, et al., "Learning to Detect Conversation Focus of Threaded Discussions", Information Sciences Institute, University of Southern California, 2017, pp. 8.

"In Context Experts From the Active Communication Threads", IP.com, Anonymously disclosed, IP.com No. IPCOM000246606D, Jun. 20, 2016, pp. 4.

S. Mehri, et al., "Chat Disentanglement Identifying Semantic Reply Relationships with Random Forests and Recurrent Neural Networks", Proceedings of the the 8th International Joint Conference on Natural Language Processing, 2017, pp. 615-623.

"Method and System for Providing Semi Automated Social Instructions", IP.com, Anonymously disclosed, IP.com No. IPCOM000255716D, Oct. 11, 2018, pp. 3.

J. Allan, "Introduction to Topic Detection and Tracking", Topic Detection and Tracking, 2002, pp. 19.

B. Butler, et al., "Community Effort in Online Groups: Who Does the Work and Why?", 2002, pp. 32.

D. Cer, et al., "Universal Sentence Encoder", 2018, pp. 7.

W., Du, et al., "Discovering Conversational Dependencies between Messages in Dialogs", Proceedings of the Thirty-First AAAI Conference on Artificial Intelligence (AAAI-17), 2017, pp. 2.

M. Elsner, et al., "You talking to me? A Corpus and Algorithm for Conversation Disentanglement", Proceedings of 46th Annual Meeting of the Association for Computational Linguistics, pp. 834 842, Jun. 2008.

M. Elsner, et al., "Disentangling Chat", Association for Computational Linguistics, 2010, pp. 23.

M. Elsner, et al., "Disentangling Chat with Local Coherence Models", Proceedings of the 49th Annual Meeting of the Association for Computational Linguistics, pp. 1179-1189, Jun. 19-24, 2011.

T. Erickson, "Making Sense of Computer-Mediated Communication (CMC): Conversations as Genres, CMC Systems as Genre Ecologies", Proceedings of the 33rd Hawaii International Conference on System Sciences, IEEE, 2000, pp. 11.

J. Jiang, et al., "Learning to Disentangle Interleaved Conversational Threads with a Siamese Hierarchical Network and Similarity Ranking", Proceedings of 2018 Conference of the North American Chapter of the Association for Computational Linguistics 2018, pp. 1812-1822, 2018.

D.P. Kingma, et al., "ADAM: A Method for Stochastic Optimization", Proceedings of the 3rd International Conference on Learning Representations. 2015, pp. 15.

E. Mayfield, et al., "Hierarchical Conversation Structure Prediction in Multi-Party Chat", Proceedings of the 13th Annual Meeting of the Special Interest Group on Discourse and Dialogue (SIGDIAL), pp. 60-69, 2012.

K.M. Hermann et al., "Teaching Machines to Read and Comprehend", 2015, pp. 9.

A. Shamekhi, et al., "Face Value? Exploring the Effects of Embodiment for a Group Facilitation Agent", Proceedings of the 2018 CHI Conference on Human Factors in Computing Systems, ACN, pp. 13.

D. Shen, et al., "Thread Detection in Dynamic Text Message Streams", SIGIR'06, Aug. 6-11, 2006, Seattle, Washington, USA. 2006 ACM, pp. 8.

M. Tan, et al., "Improved Representation Learning for Question Answer Matching", Proceedings of the 54th Annual Meeting of the Association for Computational Linguistics, pp. 464-473, Berlin, Germany, August 7-12, 2016, pp. 10.

L. Wang, et al., "Context-based Message Expansion for Disentanglement of Interleaved Text Conversations", Human Language Technologies: The 2009 Annual Conference of the North American Chapter of the ACL, pp. 200-208, Boulder, Colorado, Jun. 2009.

A.Zhang, et al., "Characterizing online discussion using coarse discourse sequences", 11th AAAI International Conference on Web and Social Media (ICWSM), 2017, pp. 10.

A. Zhang, et al., "Making Sense of Group Chat through Collaborative Tagging and Summarization", Proceedings of the ACM on Human-Computer Interaction, vol. 2, No. CSCW, Article 196. Publication date: Nov. 2018, pp. 27.

F. Khan, et al., Mining Chat-room Conversations for Social and Semantic Interactions, Computer Science and Engineering, Lehigh University, 2002, pp. 12.

\* cited by examiner

CONTEXT-AWARE CONVERSATION THREAD DETECTION FOR COMMUNICATION SESSIONS

BACKGROUND

1. Technical Field

Present invention embodiments relate to automatic detection and assignment of messages to electronic communication threads, and more specifically, to the detection of conversation threads in a multi-user communication session based on the context of messages in the session.

2. Discussion of the Related Art

In multi-user communication sessions, such as instant messaging or chat sessions, users may engage in multiple conversational topics at the same time. For example, a group of users may discuss work, lunch, and entertainment, resulting in an intermingled sequence of messages. Unlike email or forums that use conversation threading, multi-user communication sessions require the manual disentanglement of messages into threads. For example, a user may manually assemble one thread that includes messages related to the topic of work, another thread that includes messages relating to the topic of lunch, and yet another thread that includes messages relating to the topic of entertainment. Prior approaches to automating the disentanglement of conversation threads have proven to be limited in terms of capability and accuracy.

SUMMARY

According to one embodiment of the present invention, a computer system identifies threads in a communication session. A feature vector is generated for a message received from a user of a plurality of users in a communication session, wherein the feature vector includes elements for features of the message and for contextual information of the message. The feature vector for the message and feature vectors for a plurality of threads are processed using a plurality of machine learning models each associated with a corresponding thread to determine a set of probability values for classifying the message into at least one of the plurality of threads, wherein the plurality of threads includes one or more pre-existing threads with prior messages and a new thread. A classification of the message into at least one of the plurality of threads is indicated based on the set of probability values. Classification of one or more of the prior messages is adjusted based on the classification of the message. Thus, present invention embodiments automatically disentangle messages exchanged in multi-user communication sessions into threads in a self-correcting manner.

Various other embodiments of the present invention will now be discussed. In some embodiments, a beam search is performed to select a predetermined number of threads of classified messages, and threads excluded by the beam search are pruned to correct a classification of one or more messages in the pruned threads. By pruning threads, incorrect prior classifications may be corrected, and the beam search enables present invention embodiments to use fewer computing resources by avoiding having to classify a message over an entire thread space. In some embodiments, the plurality of machine learning models include long short-term memory models. By utilizing long short-term memory models, recent classifications of messages to threads can be leveraged to more accurately assign a new message to a particular thread. In some embodiments, indicating a classification of a message further includes presenting one or more groupings of messages that each include messages classified into a same thread. Thus, a user or automated conversational agent may navigate a multi-user communication session on a thread-by-thread basis, enabling the user or automated conversational agent to more clearly follow individual conversations. In some embodiments, the message is classified in real-time. Thus, a user or automated conversational agent may follow individual conversations as the conversations are occurring, enabling the user or automated conversational agent to participate in select conversations quickly and accurately. In some embodiments, the contextual information included in the feature vector includes one or more of: user identity differences between the message and one or more of the prior messages, and time differences between the message and one or more of the prior messages. By encoding user and/or time differences into a new message, the overall context of the conversation can be captured for accurately classifying the message into a thread. Embodiments of the present invention further include a method and program product for identifying threads in a communication session in substantially the same manner described above.

BRIEF DESCRIPTION OF THE DRAWINGS

Generally, like reference numerals in the various figures are utilized to designate like components.

DETAILED DESCRIPTION

Figure 1:
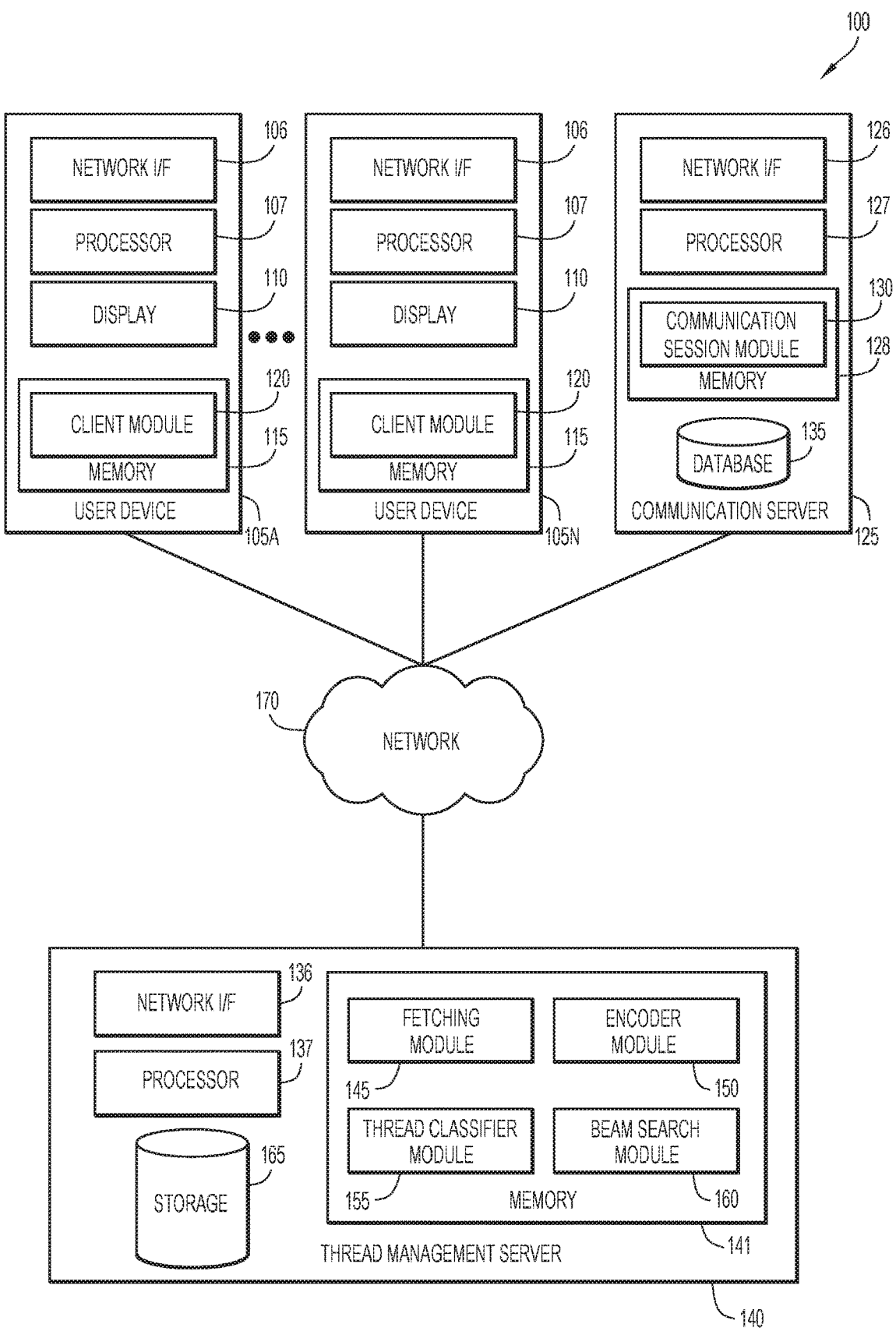
FIG. 1 is a block diagram depicting a computing environment for context-aware conversation thread detection in accordance with an embodiment of the present invention.

Present invention embodiments relate to automatic detection and assignment of messages to electronic communication threads, and more specifically, to the context-aware detection of conversation threads in multi-user communication sessions. A multi-user communication session may refer to any instant messaging or other communication session in which two or more users may discuss multiple topics at the same time. When users' messages are simply inserted into a communication session in a chronological order, multiple conversation topics can become intermingled.

Conventional approaches to automatically disentangling intermingled conversations into threads are based on pairwise comparison of messages, which excludes the context of the messages as they are exchanged between the users. In contrast, present invention embodiments take into account the contextual information by using the context history of existing threads during comparison to improve classification of new messages into threads. In particular, a machine learning approach is used to capture the contexts of existing threads and to compute the distance between the context and a newly-received input message, which is classified to one or more threads. Moreover, as users continue to exchange messages, present embodiments can extract additional contextual information, enabling classifications of previous messages to be corrected over time. Thus, present invention embodiments automatically disentangle messages exchanged in multi-user communication sessions into threads in a self-correcting manner, thus providing conversation threading to styles of communication in which users do not specify how their messages fit into a conversation (e.g., by indicating that a message is a reply to a specific message). By capturing the context of threads, present invention embodiments improve classification of new messages over conventional natural language processing approaches.

Thus, conversation threads can be identified with a high level of accuracy and trustworthiness, enabling present embodiments to be applied to a variety of useful purposes, including providing transcripts of conversations that are organized around particular topics, improving the responses of automated conversational agents (e.g., chatbots), improving the quality of machine-based chat summarization, and the like.

Various other embodiments of the present invention will now be discussed. In some embodiments, a beam search is performed to select a predetermined number of threads of classified messages, and threads excluded by the beam search are pruned to correct a classification of one or more messages in the pruned threads. By pruning threads, incorrect prior classifications may be corrected, and the beam search enables present invention embodiments to use fewer computing resources by avoiding having to classify a message over an entire thread space. In some embodiments, the plurality of machine learning models include long short-term memory models. By utilizing long short-term memory models, recent classifications of messages to threads can be leveraged to more accurately assign a new message to a particular thread. In some embodiments, indicating a classification of a message further includes presenting one or more groupings of messages that each include messages classified into a same thread. Thus, a user or automated conversational agent may navigate a multi-user communication session on a thread-by-thread basis, enabling the user or automated conversational agent to more clearly follow individual conversations. In some embodiments, the message is classified in real-time. Thus, a user or automated conversational agent may follow individual conversations as the conversations are occurring, enabling the user or automated conversational agent to participate in select conversations quickly and accurately. In some embodiments, the contextual information included in the feature vector includes one or more of: user identity differences between the message and one or more of the prior messages, and time differences between the message and one or more of the prior messages. By encoding user and/or time differences into a new message, the overall context of the conversation can be captured for accurately classifying the message into a thread.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for context-aware conversation thread detection in accordance with an embodiment of the present invention. As depicted, computing environment 100 includes user devices 105A-105N, a communication server 125, a thread management server 140, and a network 170. It is to be understood that the functional division among components of computing environment 100 have been chosen for purposes of explaining present invention embodiments and is not to be construed as a limiting example.

Each user device 105 includes a network interface (I/F) 106, at least one processor 107, a display 110, and memory 115. Memory 115 may include a client module 120. Each user device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of user device 105 to send and receive data over a network, such as network 170. A users of any user device 105A-105N may participate in one or more communication sessions with users of other devices. Each user device 105A-105N may include internal and external hardware components, as depicted and described in further detail with respect to FIG. 8.

Display 110 may include any electronic device capable of presenting information in a visual form. For example, display 110 may be a liquid crystal display (LCD), a cathode ray tube (CRT) display, a light-emitting diode (LED) display, an electronic ink display, and the like. Information relating to a multi-user communication session may be displayed to a user of user device 105 via display 110, including messages sent by users and/or received from other users, text being composed by a user prior to sending a message, indications of threads to which particular messages may belong, and the like.

Client module 120 may include one or more modules or units to perform various functions of present invention embodiments described below. Client module 120 may be implemented by any combination of any quantity of software and/or hardware modules or units, and may reside within memory 115 of user device 105 for execution by a processor, such as processor 107.

Client module 120 may include any messaging client that enables users of user devices 105A-105N to participate in multi-user communication sessions. Client module 120 may send and receive messages of a multi-user communication session, which may be presented to a user via display 110. In some embodiments, the exchange of messages between each client module 120 of user devices 105A-105N is mediated by communication server 125. In other embodiments, each user device 105A-105N may directly exchange messages, e.g., in a peer-to-peer manner. Client module 120 may indicate a history of a communication session by presenting messages in a chronological order, such as the order in which the messages are sent by participants in the communication session or the order in which communication server 125 receives messages from participants. In addition to the content of a message itself, client module 120 may indicate a time that each message is sent or received, and an identity of the participant who authored each message. Participants may be identified by a legal name, nickname, email address, user name, or any other identifier.

Communication server 125 may include a network interface 126, at least one processor 127, memory 128, and storage 135. Memory 128 may include a communication session module 130. In various embodiments of the present invention, communication server 125 may include a laptop computer, a tablet computer, a netbook computer, a personal computer (PC), a desktop computer, a personal digital assistant (PDA), a smart phone, or any programmable electronic device capable of executing computer readable program instructions. Network interface 126 enables components of communication server 125 to send and receive data over a network, such as network 170. In general, communication server 125 may act as a server for multi-user communication sessions by transmitting messages that are received from each participant in a session to the other participants in the session.

Communication session module 130 may include one or more modules or units to perform various functions of present invention embodiments described below. Communication session module 130 may be implemented by any combination of any quantity of software and/or hardware modules or units, and may reside within memory 128 of communication server 125 for execution by a processor, such as processor 127. Communication session module 130 may host multi-user communication sessions between users of user devices 105A-105N. Each user device 105A-105N may register with communication session module 130 in order to send and receive messages with other user devices. Each message transmitted by communication session module 130 may include content of the message, an identity of the author of the message, and a timestamp that indicates a time when the message was sent by a user device or received by communication server 125.

Storage 135 may include any non-volatile storage media known in the art. For example, storage 135 can be implemented with a tape library, optical library, one or more independent hard disk drives, or multiple hard disk drives in a redundant array of independent disks (RAID). Similarly, data in storage 135 may conform to any suitable storage architecture known in the art, such as a file, a relational database, an object-oriented database, and/or one or more tables. In some embodiments, storage 135 may store data relating to multi-user communication session history, including the content of messages, the times at which messages are sent and/or received, the identity of the author of each message, and the like.

Thread management server 140 includes a network interface 136, at least one processor 137, memory 141, and storage 165. Memory 141 includes a fetching module 145, an encoder module 150, a thread classifier module 155, and a beam search module 160. In various embodiments of the present invention, thread management server 140 may include a laptop computer, a tablet computer, a netbook computer, a personal computer (PC), a desktop computer, a personal digital assistant (PDA), a smart phone, or any programmable electronic device capable of executing computer readable program instructions. Network interface 136 enables components of thread management server 140 to send and receive data over a network, such as network 170. In general, thread management server 140 and its modules may process messages in multi-user communication sessions to perform real-time classification of the messages into threads based on the context of the messages in the session. Thread management server 140 may include internal and external hardware components, as depicted and described in further detail with respect to FIG. 8.

Fetching module 145, encoder module 150, thread classifier module 155, and beam search module 160 may include one or more modules or units to perform various functions of present invention embodiments described below. Fetching module 145, encoder module 150, thread classifier module 155, and beam search module 160 may be implemented by any combination of any quantity of software and/or hardware modules or units, and may reside within memory 141 of thread management server 140 for execution by a processor, such as processor 137.

Fetching module 145 may obtain messages in a multi-user communication session from one or more sources. In some embodiments, fetching module 145 accesses communication server 125 to obtain messages exchanged in a multi-user communication session, including timestamp metadata and the identity of the author of each message. Additionally or alternatively, fetching module 145 may obtain messages from one or more devices of user devices 105A-105N. Fetching module 145 may obtain messages according to a predetermined schedule or may obtain messages on an ad hoc basis when the messages become available.

Encoder module 150 may encode messages by converting messages into feature vectors whose elements embed the contents of messages as well as contextual information that is associated with each message. Encoder module 150 may employ a trained natural language processing model to generate a vector that represents a message. A vector generated by encoder module 150 may include any number of dimensions or elements; in some embodiments, a vector may be include 512 elements. Encoder module 150 may include any language encoder, such as a one-hot encoder, a term frequency—inverse document frequency (tf-idf) encoder, a word embedding encoder, and the like. In some embodiments, encoder module 150 uses a deep averaging network to obtain a static feature representation for a message in the form of sentence embeddings. Encoder module 150 may utilize the Universal Sentence Encoder for encoding messages.

Encoder module 150 may also encode contextual information along with the content of a message, including the identity of the author of the message and the time difference between the message and other messages in a communication session. In some embodiments, encoder module 150 encodes a message by concatenating the encoded content of the message with n-dimensional embeddings that include the user identity differences between the message and previous messages in a communication session and/or the time differences between messages in the session. For example, encoder module 150 may generate a message by concatenating the encoded content of the message with two 20-dimensional embeddings, including: user-identity differences between the message and one or more previous messages, and time differences, by mapping the time difference between a message and one or more previous messages into a number ranges, such as one minute, one hour, seventy-two hours, etc.

Thread classifier module 155 classifies a received message by employing machine learning models to process the message's vector, generated by encoder module 150, as well as one or more vectors based on other messages that have been classified into a corresponding one or more threads. In particular, thread classifier module 155 may employ a number of long short-term memory (LSTM) recurrent neural network models to process a corresponding number of vectors, each representative of a thread of messages in a communication session. Each LSTM model may separately process a newly-received message, and thread classifier module 155 may calculate a probability value representing the likelihood of the newly-received message belonging to each thread. Each LSTM model may be trained using one or more corpora of labeled training data. Thus, thread classifier module 155 may identify one or more threads that are semantically closest to a received message. The classification of messages into threads using machine learning models is discussed in further detail below with reference to FIG. 2.

Beam search module 160 may perform self-correction of messages by exploring a graph or tree of messages assigned to threads, selecting a particular number of threads, and pruning any threads excluded by the beam search. Beam search module 160 may generate a graph of message classifications by thread, which expands with each incoming message. Paths in the graph may be selected according to the size of the beam search, which selects only the K most promising nodes based on the probability of messages belonging to particular threads. For example, if a beam search excludes a path in a tree that included a message that was assigned to a particular thread, the assignment of that message may be retrospectively corrected. Thus, a message may initially be assigned to one thread, but may later, as the classification of additional messages further reveals the context of messages in a communication session, the message may be re-assigned as belonging to a different thread. The self-correction of messages using a beam search is discussed in further detail below with reference to FIGS. 5A-5D.

Storage 165 may include any non-volatile storage media known in the art. For example, storage 165 can be implemented with a tape library, optical library, one or more independent hard disk drives, or multiple hard disk drives in a redundant array of independent disks (RAID). Similarly, data in storage 165 may conform to any suitable storage architecture known in the art, such as a file, a relational database, an object-oriented database, and/or one or more tables. Storage 165 may store data relating to context-aware threading of messages in multi-user communication sessions, such as threads of messages that are organized according to a same topic. Stored thread information may be accessed by a user of any user device 105A-105N for real-time consumption and/or subsequent viewing.

Network 170 may include a local area network (LAN), a wide area network (WAN) such as the Internet, or a combination of the two, and includes wired, wireless, or fiber optic connections. In general, network 170 can be any combination of connections and protocols known in the art that will support communications between user devices 105A-105N, communication server 125, and/or thread management server 140 via their respective network interfaces in accordance with embodiments of the present invention.

Figure 2:
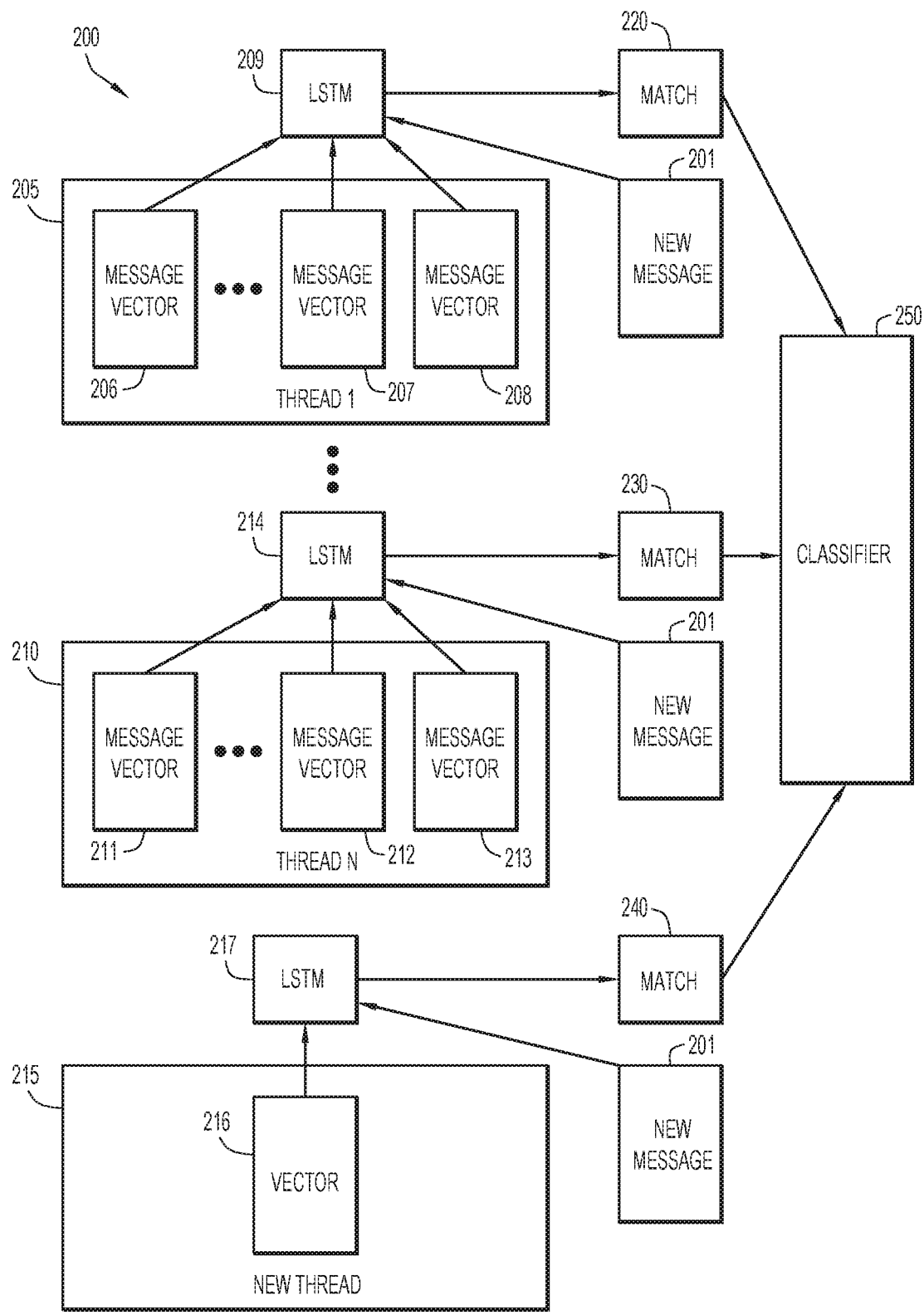
FIG. 2 is a block diagram depicting a context-aware thread detection system in accordance with an embodiment of the present invention.

FIG. 2 is a block diagram depicting a context-aware thread detection system 200 in accordance with an embodiment of the present invention. Thread detection system 200 may be implemented by thread classifier module 155 of computing environment 100. As depicted, thread detection system 200 includes a first thread 205 with feature vectors 206-208 that correspond to messages in the first thread, an nth thread 210 with feature vectors 211-213 that correspond to messages in the nth thread, a new thread 215 with a randomized feature vector 216, a plurality of long short-term memory (LSTM) models 209, 214, and 217 each associated with a particular thread, a feature vector for a new message 201, matching vectors 220-240, and a classifier 250. Each feature vector may correspond to a single message of a participant in a multi-user communication session, and may be generated by encoder module 150 of thread management server 140. Feature vector 201 corresponds to a new message that has not yet been assigned to a thread.

A thread feature vector may be generated for each thread by concatenating the feature vectors of each message in that thread. For example, a thread feature vector for the first thread 205 may be generated by concatenating the feature vectors 206-208 of messages assigned to the first thread, and a thread feature vector for the nth thread 210 may be generated by concatenating the feature vectors 211-213 of messages assigned to the nth thread. In some embodiments, a thread feature vector may be limited to a predetermined number of recent messages in a thread; for example, a thread feature vector may be assembled by concatenating the last twenty messages assigned to each thread, despite there being more than twenty total messages assigned to some threads. Similarly, a thread feature vector may include fewer message feature vectors than the maximum if the thread has not been assigned a number of messages exceeding the maximum. New thread 215 may include a randomized feature vector 216 (e.g., a feature vector initialized with random values for its elements) that contains learnable parameters, since there is no prior history of messages to compare a new message against if the message represents a first message in a new topic of conversation.

Each LSTM model 209, 214, and 217 may be a message-level single-directional LSTM that independently encodes the thread feature vector and the feature vector of the new message 201. The inputs of the thread feature vector and the new message feature vector 201 are processed by each LSTM model to generate sequence outputs. Given the sequence outputs of each thread's LSTM model, weighted mean pooling can be performed to obtain a context embedding that is used to calculate the matching vector. Matching vectors 220, 230, and 240 are then processed by classifier 250 to generate a probability value of the new message being associated with an existing or new thread.

In some embodiments, a context embedding $e_{cxt}^l$ for a thread and a new message is obtained via equation (1):

$$e_{cxt}^l = \Sigma_k \alpha_k^l h_{\delta(l,k)}^l \qquad (1)$$

where $\alpha_k^l$ is determined according to equation (2):

$$\alpha_k^l = \text{softmax}(h_{\delta(l,k)}^l \cdot \hat{h}_t)_{k=[1,K]} \qquad (2)$$

and where l refers to the l-th thread, k refers to the k-th message in a particular thread, $\delta(l, k)$ is a function that returns the index of the last k-th message of a thread, K refers to the maximum K previous messages in a thread, and $\hat{h}_t$ denotes the one-step LSTM encoded new message. Next, the matching vector $e_{match}^l$ is computed according to equation (3):

$$e_{match}^l = N(e_{ext}^l) \times N(\hat{h}_t) \qquad (3)$$

where N(x) normalizes x by the $l_2$ norm, and the × operator is element-wise multiplication. Each matching vector is then used to calculate the probability P that the new message should receive a thread label $t_i$ of a particular thread T according to equation (4):

$$P(t_i = T) = \frac{\exp(\gamma \tanh(w \cdot e_{match}^l))}{\sum_{T_{i-1}^{l'}} \exp(\gamma \tanh(w \cdot e_{match}^{l'}))} \qquad (4)$$

where γ is a scaling hyper-parameter, w is a trainable vector, and $T_{i-1}^l$ indicates a thread containing all messages of the same label.

Figure 3:
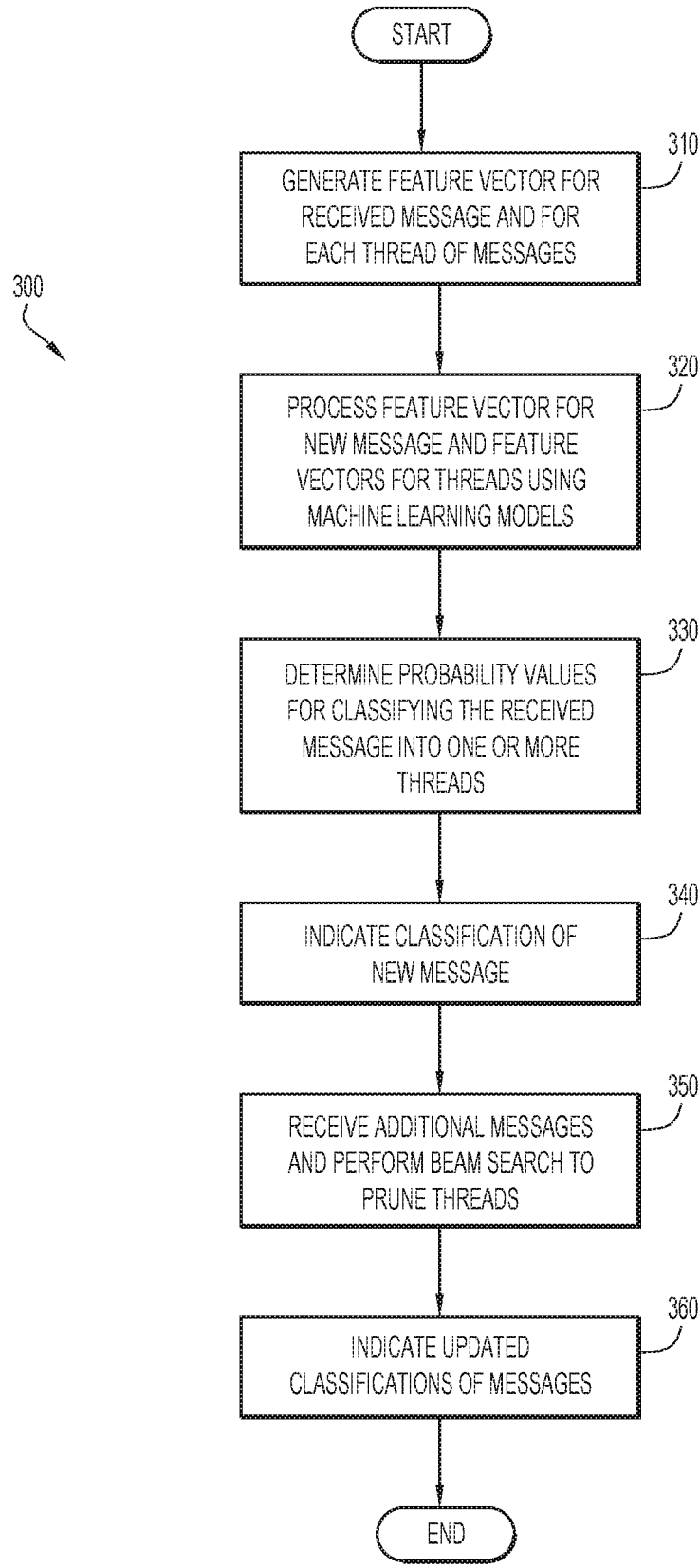
FIG. 3 is a flow chart depicting a method of context-aware conversation thread detection in accordance with an embodiment of the present invention.

FIG. 3 is a flow chart depicting a method of context-aware conversation thread detection 300 in accordance with an embodiment of the present invention.

A feature vector is generated for a newly-received message and for each thread of previously-classified messages at operation 310. Fetching module 145 may obtain a new message and previous messages of a multi-user communication session that have been classified to one or more threads from one or more of communication server 125 and user devices 105A-105N. Encoder module 150 may perform encoding to generate a feature vector whose elements capture the word embeddings of the content of the new message, which may be concatenated with additional elements that capture the user identity of the new message and previous messages in the communication session, as well as time differences between the new message and previous messages in the communication session. Similarly, a thread feature vector may be generated for each thread of messages by first encoding each message in a thread into a vector, and then combining the resulting vectors into a single thread-level vector via concatenation.

The feature vector for the new message and the feature vectors corresponding to the threads of other messages are processed using machine learning models at operation 320. One long short-term memory (LSTM) model may be employed per each thread to independently process the thread feature vector and the new message feature vector. Another LSTM model may process a randomized feature vector in place of a thread feature vector for the purpose of determining whether the new message represents a new topic of conversation and thus ought to be designated as the first message in a new thread.

Probability values are determined for classifying the received message into one or more threads at operation 330. Each LSTM model may output a matching vector based on the independent processing of the thread feature vector (or the randomized vector) and the new message vector, and thread classifier module 155 may compute a set of probability values that represents the likelihood of the new message belonging to each of the one or more threads and a new thread.

The classification of the new message is indicated at operation 340. Thread classifier module 155 may classify the new message into a thread based on the set of probability values. In particular, the new message may be classified into an existing or new thread depending on whichever probability value is the highest. In some embodiments, messages may be classified into multiple threads at first until beam search module 160 performs self-correction operations.

The classification of messages into threads may be indicated to a user via client module 120. In some embodiments, a user may be able to browse messages on a thread-by-thread basis in order to read one or more messages that have been categorized to a same thread. Thus, instead of reading an entangled history of a multi-user communication session, a user may opt to read only messages assigned to a same thread that relate to a particular topic. In some embodiments, the likelihood of each message belonging to a thread may be indicated to a user based on the probability values.

Additional messages are received and a beam search is performed to prune threads at operation 350. As incoming messages are classified into threads, beam search module 160 may construct a tree of classifications of messages based on the probability values for the messages. Beam search module 160 may prune the tree based on the beam size to exclude messages from classification in multiple threads and to perform self-correction as subsequent messages provide additional context. Updated thread classifications for messages are indicated at operation 360. As beam search module 160 prunes threads to update the thread classifications of messages, any changed classifications may be indicated to a user.

Figure 4:
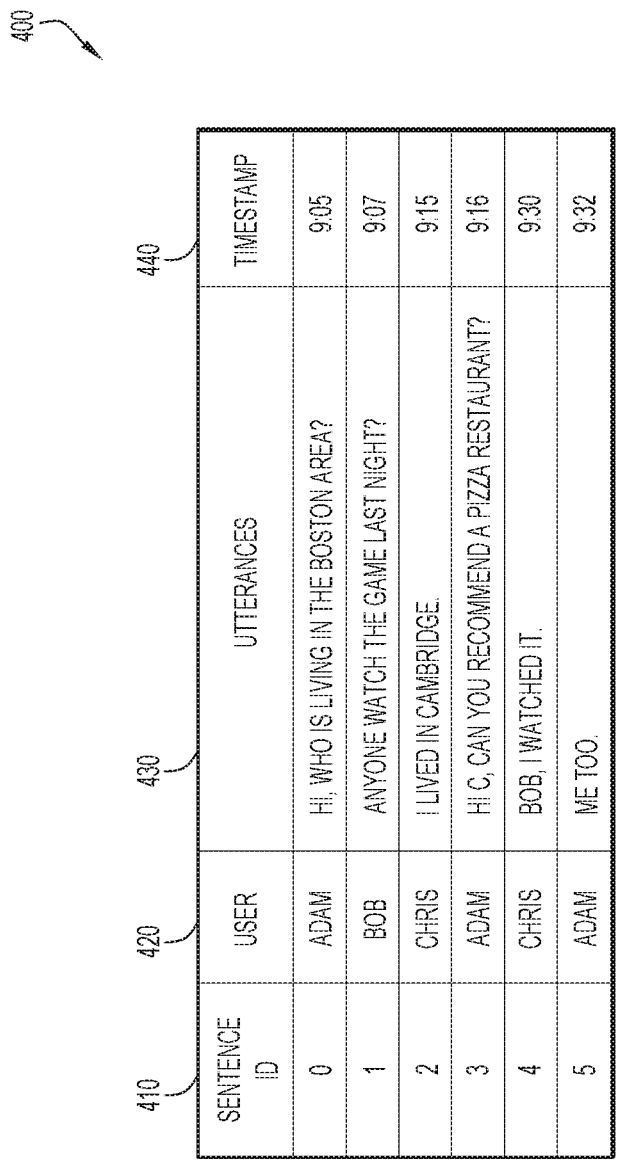
FIG. 4 is a chart depicting a multi-user communication session history in accordance with an embodiment of the present invention

FIG. 4 is a chart depicting a multi-user communication session history 400 in accordance with an embodiment of the present invention. As depicted, multi-user communication session history 400 includes a sentence field 410 for each message, a user identity field 420 that indicates the author of each message, an utterances field 430 that includes the content of each message, and a timestamp field 440 that indicates the time at which each message was sent by users of user device 105A-105N or received by communication server 125.

FIGS. 5A-5D are block diagrams depicting message trees 500-503 for real-time context-aware conversation thread detection. By way of example, FIGS. 5A-5D represent the classification of messages of the multi-user communication session history 400. Message trees 500-503 may depict messages in a multi-user communication session being assigned to threads according to the probability values calculated by thread classifier module 155. The probability values indicate the similarity, based on the context of the communication session, of the new message to each thread.

Message tree 500 depicts a first message S(0) (e.g., "Hi, who is living in the Boston area?"), depicted by node 505. As message S(0) is the first message in a communication session, there is no prior history to provide context for assigning the message to a thread. Thus, message S(0) may be assigned to thread T0.

Figure 5A:
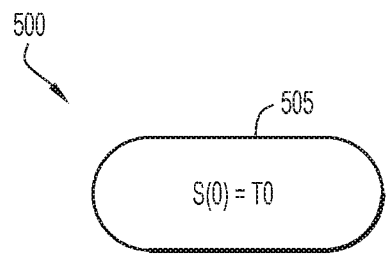
FIGS. 5A-5D are block diagrams depicting real-time context-aware conversation thread detection in accordance with an embodiment of the present invention.
Figure 5B:
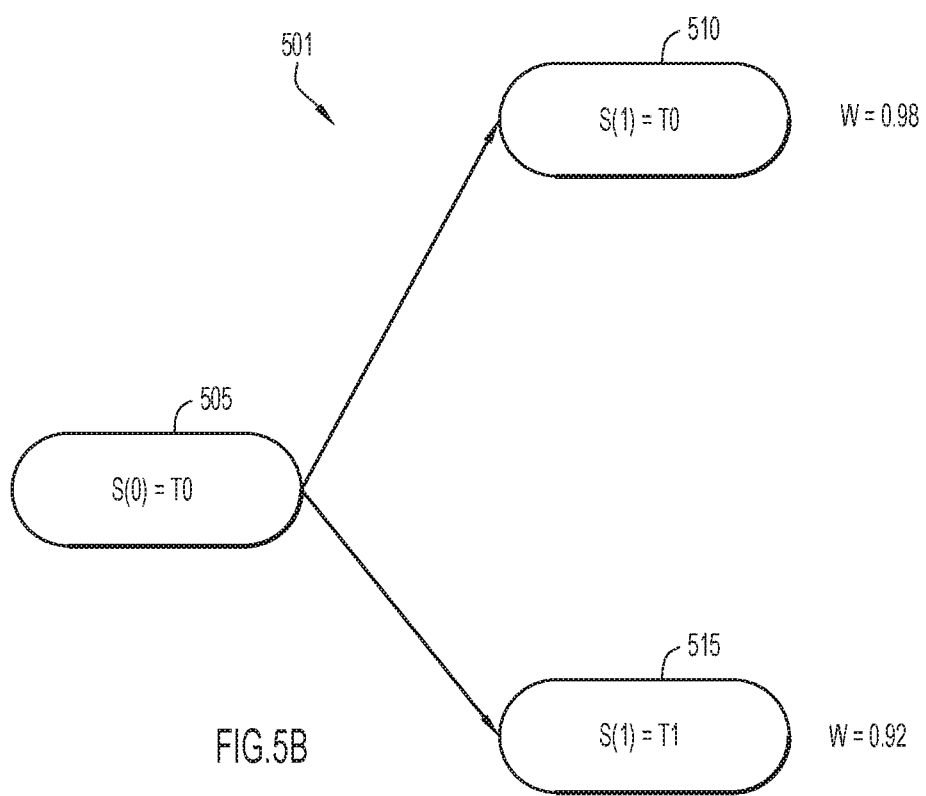

FIG. 5B depicts message tree 501 in which a second message S(1) (e.g., "Anyone watch the game last night?") has been received. After processing message S(1), thread classifier module 155 computes probability values for assigning message S(1) to thread T0 (e.g., related to the topic of Boston) or to a new thread, T1. In the depicted example, message S(1) has a probability value of 0.98 of being assigned to thread T0 and a probability value of 0.92 of being assigned to thread T1. Thus, based on the probability values determined from the current context of the communication session, it is more likely that message S(1) represents a same topic of discussion and should thus be assigned to existing thread T0. However, subsequent messages can alter the context of previous messages, and beam search module 160 may later determine that a message's classification should be corrected (e.g., by re-assigning the classification of S(1) from thread T0 to thread T1), in contradiction to the probability values determined at the time when the message was received. Beam search module 160 may select a number of message assignments that fall within the beam size, and prune the rest. In this example, the beam size is 2, so both nodes 510 and 515 are remaining in tree 502.

Figure 5C:
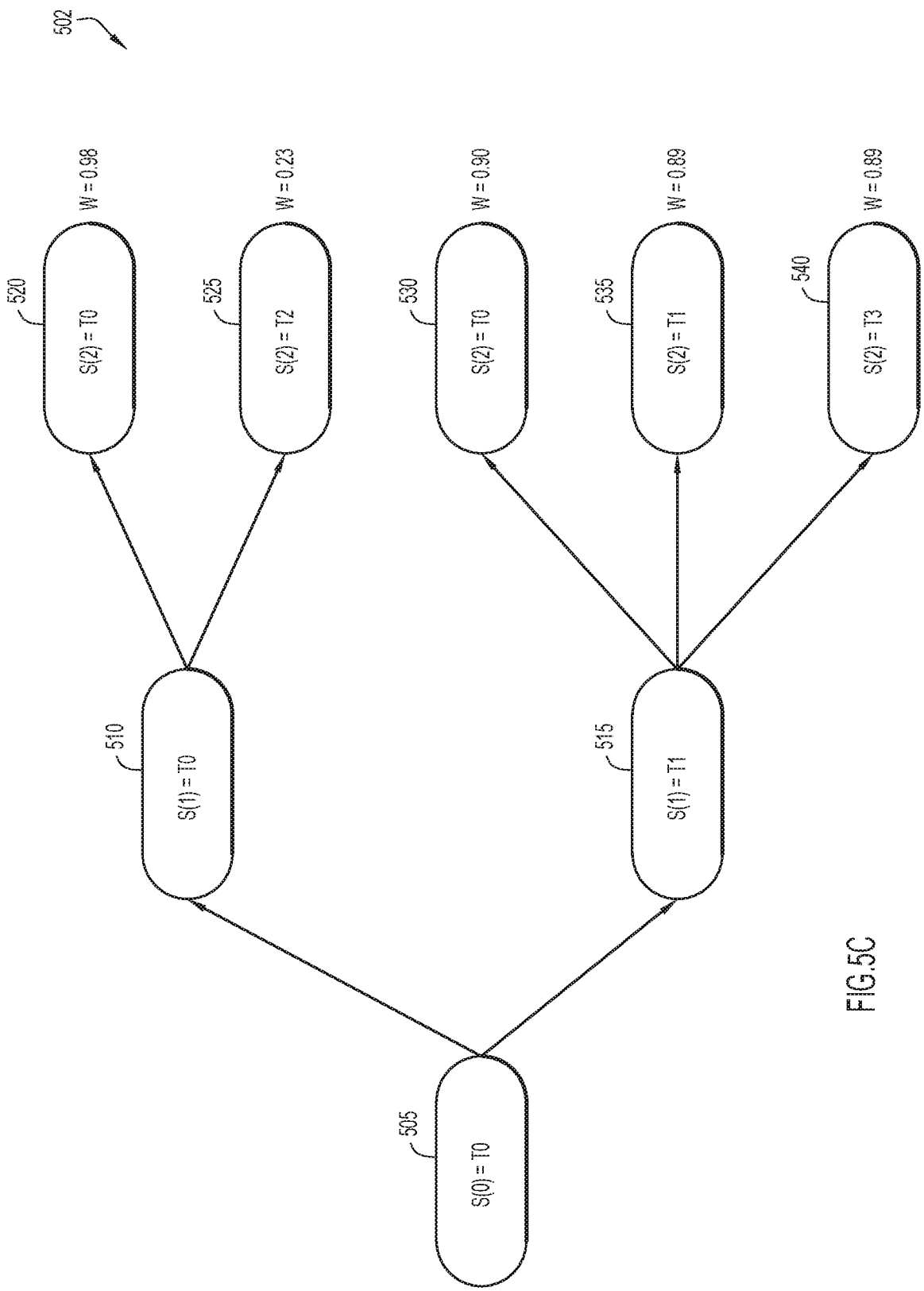

FIG. 5C depicts message tree 502 in which a third message S(2) (e.g., "I lived in Cambridge") has been received. As there are already two possible existing threads, the message S(2) has the option of being assigned to existing thread T0 (e.g., relating to Boston), existing thread T1 (e.g., relating to the game), or new thread T2. In the depicted example, message S(2) has a probability value of 0.98 of being assigned to thread T0 if message S(1) also is assigned to thread T0, a probability value of 0.23 of being assigned to new thread T2 if message S(1) also is assigned to thread T0, a probability value of 0.90 of being assigned to thread T0 if message S(1) is assigned to thread T1, a probability value of 0.89 of being assigned to thread T1 if message S(1) is assigned to thread T1, and a probability value of 0.89 of being assigned to new thread T3 if message S(1) is assigned to thread T1. When beam search module 160 performs pruning on message tree 502 using a beam size of two, the two nodes with the highest probability values are preserved. Thus, beam search module 160 may select nodes 520 and 530 since those nodes have the highest probability values in tree 502. Since nodes 525, 535, and 540 fall outside of the beam search, these nodes are pruned and are therefore omitted from message tree 503.

Figure 5D:
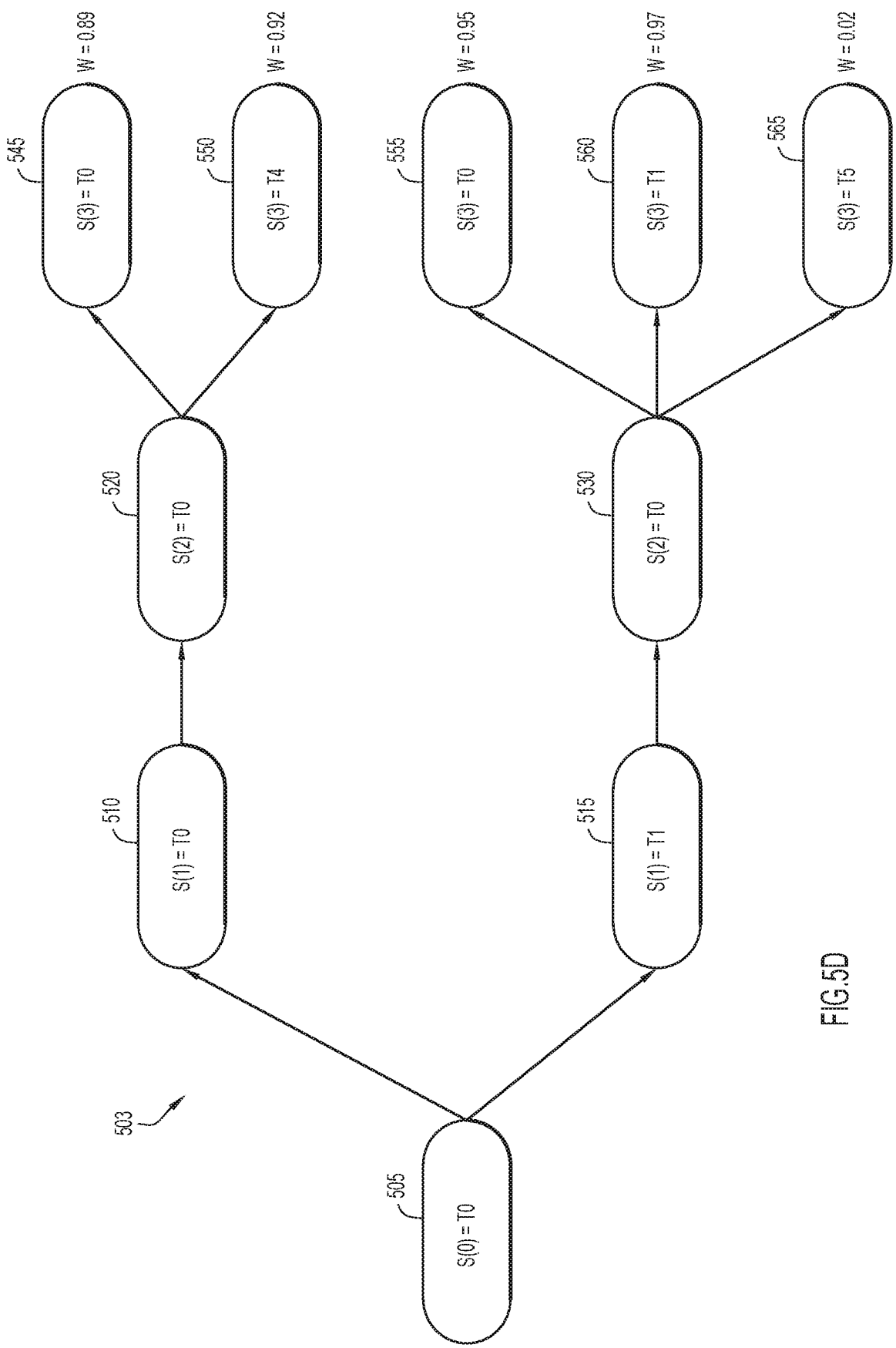

FIG. 5D depicts message tree 503 in which a fourth message S(3) (e.g., "Hi C, can you recommend a pizza restaurant?") has been received. Message S(3) has the option of being assigned to thread T0, thread T1, new thread T4, or new thread T5. Since beam search module 160 pruned all of the messages that could have potentially been assigned to threads T2 and T3, these threads are no longer options for classification. When a beam search of size two is performed on message tree 503, nodes 555 and 560 may be selected, and nodes 545, 550, and 565 may be pruned. By pruning nodes 545 and 550, node 520 is left with no more children, so node 520 is pruned as well. Similarly, node 510 will be pruned. Thus, self-correction of an assignment may be performed: although tree 501 indicated (e.g., based on the probability values) that message S(1) was more likely to belong to thread T0 than to thread T1, subsequent message assignment and pruning has removed node 510, indicating that message S(1) should be re-assigned to thread T1. Thus, messages S(0), S(2), S(3) are assigned to thread T0 (e.g., relating to Boston).

Figure 6:
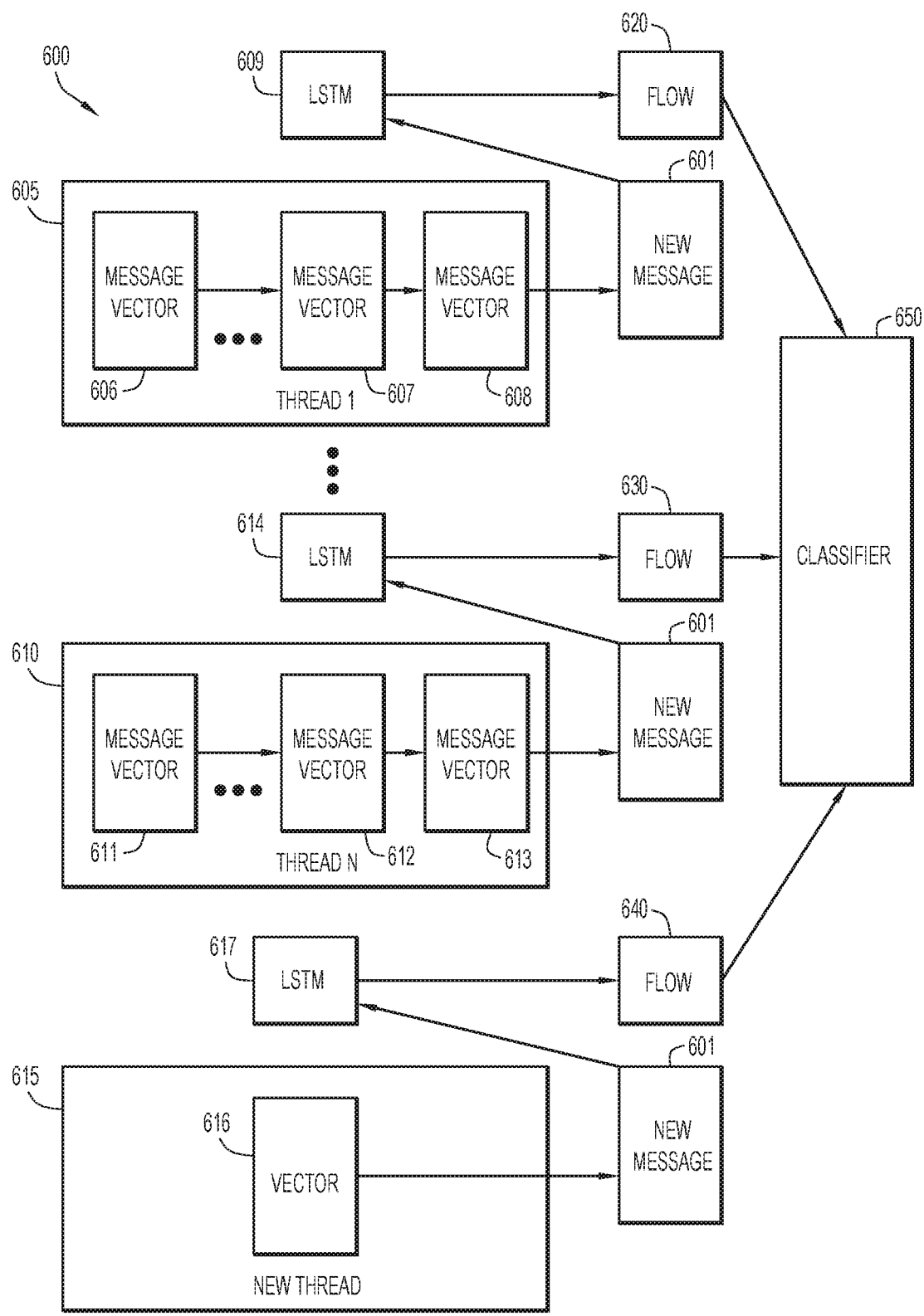
FIG. 6 is a block diagram depicting a conversation flow-based thread detection system in accordance with an embodiment of the present invention.

FIG. 6 is a block diagram depicting a conversation flow-based thread detection system 600 in accordance with an embodiment of the present invention. Thread detection system 600 classifies a message based on conversational flow and genre, and assigns a message to a thread with which it is likely to form a fluent conversation. Thread detection system 600 may be implemented by thread classifier module 155 of computing environment 100. As depicted, thread detection system 600 includes a first thread 605 with feature vectors 606-608 that correspond to messages in the first thread, an nth thread 610 with feature vectors 611-613 that correspond to messages in the nth thread, a new thread 615 with a randomized feature vector 616, a plurality of long short-term memory (LSTM) models 609, 614, and 617 each associated with a particular thread, a feature vector for a new message 601, flow vectors 620-640, and a classifier 650. Each feature vector may correspond to a single message of a participant in a multi-user communication session, and may be generated by encoder module 150 of thread management server 140. Feature vector 601 corresponds to a new message that has not yet been assigned to a thread.

A thread feature vector may be generated for each thread by concatenating the feature vectors of each message in that thread along with the new message feature vector. Thus, unlike thread detection system 200, the feature vectors for messages in a thread are processed together with the new message feature vector. For example, a feature vector for the first thread 605 may be generated by concatenating the feature vectors 606-608 of messages assigned to the first thread as well as message feature vector 601, and a thread feature vector for the nth thread 610 may be generated by concatenating the feature vectors 611-613 of messages assigned to the nth thread. In some embodiments, a thread feature vector may be limited to a predetermined number of recent messages in a thread; for example, a thread feature vector may be assembled by concatenating the last twenty messages assigned to each thread, despite there being more than twenty total messages assigned to some threads. Similarly, a thread feature vector may include fewer message feature vectors than the maximum if the thread has not been assigned a number of message exceeding the maximum. New thread 615 may include a randomized feature vector 616 (e.g., a feature vector initialized with random values for its elements) that contains learnable parameters, since there is no prior history of messages to compare a new message against if the message represents a first message in a new topic of conversation.

Classifier 650 may process the flow vectors 620-640 output by LSTM models 609, 614, and 617, to generate a set of probability values for classifying the new message into a thread. In some embodiments, classifier 650 calculates the probability P that the new message should receive a thread label $t_i$ of a particular thread T according to equation (5):

$$P(t_i = T) = \frac{\exp(\gamma \tanh(w \cdot e_{flow}^l))}{\sum_{T_{i-1}^{l'}} \exp(\gamma \tanh(w \cdot e_{flow}^{l'}))} \quad (5)$$

where $e_{flow}^l$ is a flow vector from the LSTM models, $\gamma$ is a scaling hyper-parameter, w is a trainable vector, $T_{i-1}^l$ indicates a thread containing all messages of the same label, and l' indicates that the value is an enumeration of all threads in the summation. The search trees may be generated and pruned based on the resulting probability values from the flow-based thread detection system, and the classifications self-corrected in substantially the same manner described above.

Figure 7:
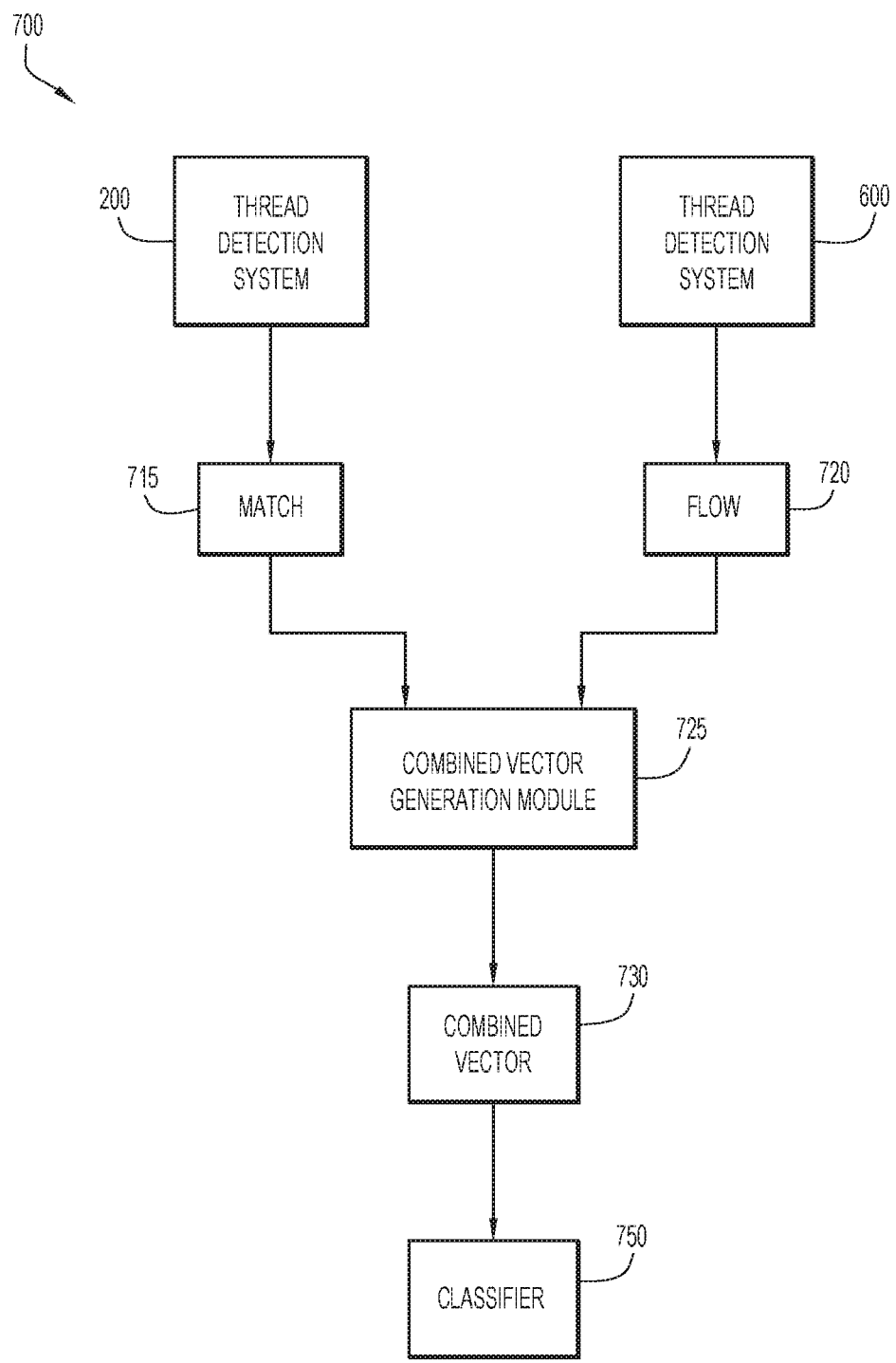
FIG. 7 is a block diagram depicting a combined context-aware and conversation flow-based thread detection system in accordance with an embodiment of the present invention.

FIG. 7 is a block diagram depicting a combined context-aware and conversation flow-based thread detection system 700 in accordance with an embodiment of the present invention. Combined thread detection system 700 may combine aspects of thread detection systems 200 and 600. In particular, when a new message is received, thread detection system 700 may generate a match vector 715 in substantially the same manner as match vectors are generated by thread detection system 200 of FIG. 2, and may generate a flow vector 720 in substantially the same manner as flow vectors are generated by thread detection system 600 of FIG. 6.

Combined vector generation module 725 may generate combined vector 730, represented as $e_{combine}^l$, according to equation (6):

$$e_{combine}^l = (1-g)e_{match}^l + g\, e_{flow}^l \qquad (6)$$

where g is determined according to equation (7):

$$g = \mathrm{sigmoid}(N(e_{ext}^l) - N(\hat{h}_t) | \cdot w') \qquad (7)$$

where w' is a parameter vector. Classifier 750 then processes combined vector 730 to compute a probability value similarly to how classifier 650 generates probability values based on the flow vectors (e.g., $e_{combine}^l$, replaces $e_{flow}^l$ in equation (5)). The combined vector basically weights the results from the different thread detection systems. The search trees may be generated and pruned based on the resulting probability values from the combined thread detection system, and the classifications self-corrected in substantially the same manner described above.

Figure 8:
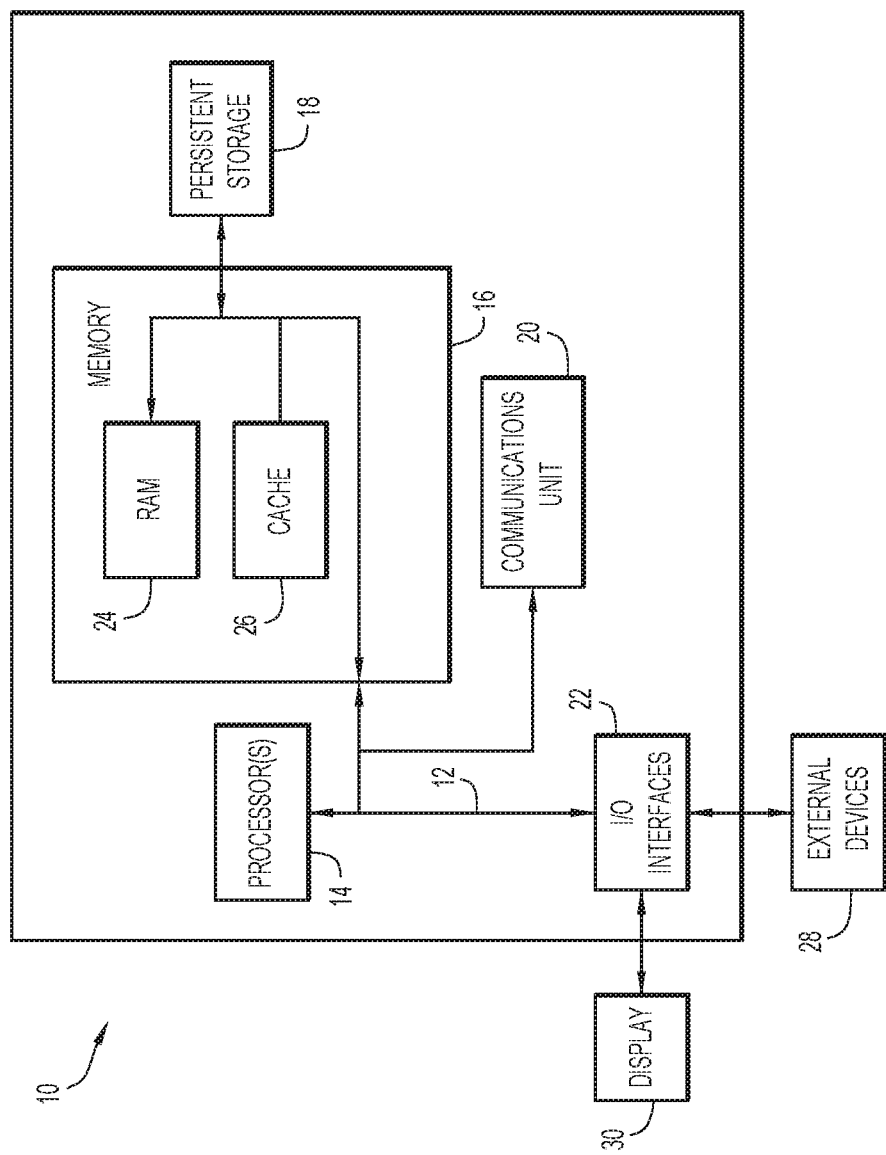
FIG. 8 is a block diagram depicting a computing device in accordance with an embodiment of the present invention.

FIG. 8 is a block diagram depicting components of a computer 10 suitable for executing the methods disclosed herein. Computer 10 may implement user devices 105A-105N, communication server 125, and/or thread management server 140 in accordance with embodiments of the present invention. It should be appreciated that FIG. 8 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to context-aware conversation thread detection (e.g., message content, message time and authorship metadata, message thread classification data, machine learning model data, training corpora data, etc.) may be stored within any conventional or other data structures (e.g., files, arrays, lists, stacks, queues, records, etc.) and may be stored in any desired storage unit (e.g., database, data or other repositories, queue, etc.). The data transmitted between user devices 105A-105N, communication server 125 and/or thread management server 140 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to context-aware conversation thread detection (e.g., message content, message time and authorship metadata, message thread classification data, machine learning model data, training corpora data, etc.) may include any information provided to, or generated by, user devices 105A-105N, communication server 125 and/or thread management server 140. Data relating to context-aware conversation thread detection may include any desired format and arrangement, and may include any quantity of any types of fields of any size to store any desired data. The data relating to context-aware conversation thread detection may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to context-aware conversation thread detection), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of performing context-aware conversation thread detection.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, client module 120, communication session module 130, fetching module 145, encoder module 150, thread classifier module 155, beam search module 160, etc.). These systems may include any types of monitors and input devices (e.g., keyboard, mouse, voice recognition, etc.) to enter and/or view information.

It is to be understood that the software (e.g., browser software, communications software, server software, client module 120, communication session module 130, fetching module 145, encoder module 150, thread classifier module 155, beam search module 160, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., browser software, communications software, server software, client module 120, communication session module 130, fetching module 145, encoder module 150, thread classifier module 155, beam search module 160, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to context-aware conversation thread detection). The database system may be implemented by any number of any conventional or other databases, data stores or storage structures (e.g., files, databases, data structures, data or other repositories, etc.) to store information (e.g., data relating to context-aware conversation thread detection). The database system may be included within or coupled to the server and/or client systems. The database systems and/or storage structures may be remote from or local to the computer or other processing systems, and may store any desired data (e.g., data relating to context-aware conversation thread detection).

The present invention embodiments may employ any number of any type of user interface (e.g., Graphical User Interface (GUI), command-line, prompt, etc.) for obtaining or providing information (e.g., data relating to context-aware conversation thread detection), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, applying machine learning techniques to analyze, classify, and separate entangled data objects that share common characteristics based on the common characteristics as well as the context of the entanglement.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of identifying threads in a communication session comprising:
   generating, via a processor, a feature vector for a message received from a user of a plurality of users in a communication session, wherein the feature vector includes elements for features of the message and for contextual information of the message;
   processing, via the processor, the feature vector for the message and feature vectors for a plurality of threads using a plurality of machine learning models, each machine learning model associated with a corresponding thread, to determine a set of probability values for classifying the message into at least one of the plurality of threads, wherein the plurality of threads includes one or more pre-existing threads with prior messages and a new thread;
   indicating, via the processor, a classification of the message into at least one of the plurality of threads based on the set of probability values;
   adjusting, via the processor, classification of one or more of the prior messages based on the classification of the message;
   performing, via the processor, a beam search to select a predetermined number of threads of classified messages; and
   pruning, via the processor, threads excluded by the beam search to correct a classification of one or more messages in the pruned threads.

2. The computer-implemented method of claim 1, wherein the plurality of machine learning models include long short-term memory models.

3. The computer-implemented method of claim 1, wherein indicating a classification of the message further comprises presenting one or more groupings of messages that each include messages classified into a same thread.

4. The computer-implemented method of claim 1, wherein the message is classified in real time.

5. The computer-implemented method of claim 1, wherein the contextual information included in the feature vector comprises one or more of: user identity differences between the message and one or more of the prior messages, and time differences between the message and one or more of the prior messages.

6. A computer system for identifying threads in a communication session comprising, the computer system comprising:
   one or more computer processors;
   one or more computer readable storage media;
   program instructions stored on the one or more computer readable storage media for execution by at least one of the one or more computer processors, the program instructions comprising instructions to:
   generate a feature vector for a message received from a user of a plurality of users in a communication session, wherein the feature vector includes elements for features of the message and for contextual information of the message;
   process the feature vector for the message and feature vectors for a plurality of threads using a plurality of machine learning models, each machine learning model associated with a corresponding thread, to determine a set of probability values for classifying the message into at least one of the plurality of threads, wherein the plurality of threads includes one or more pre-existing threads with prior messages and a new thread;
   indicate a classification of the message into at least one of the plurality of threads based on the set of probability values;
   adjust classification of one or more of the prior messages based on the classification of the message;
   perform a beam search to select a predetermined number of threads of classified messages; and
   prune threads excluded by the beam search to correct a classification of one or more messages in the pruned threads.

7. The computer system of claim 6, wherein the plurality of machine learning models include long short-term memory models.

8. The computer system of claim 6, wherein the program instructions to indicate a classification of the message further comprise instructions to present one or more groupings of messages that each include messages classified into a same thread.

9. The computer system of claim 6, wherein the message is classified in real time.

10. The computer system of claim 6, wherein the contextual information included in the feature vector comprises one or more of: user identity differences between the message and one or more of the prior messages, and time differences between the message and one or more of the prior messages.

11. A computer program product for identifying threads in a communication session, the computer program product comprising one or more computer readable storage media collectively having program instructions embodied therewith, the program instructions executable by a computer to cause the computer to:
   generate a feature vector for a message received from a user of a plurality of users in a communication session, wherein the feature vector includes elements for features of the message and for contextual information of the message;
   process the feature vector for the message and feature vectors for a plurality of threads using a plurality of machine learning models, each machine learning model associated with a corresponding thread, to determine a set of probability values for classifying the message into at least one of the plurality of threads, wherein the plurality of threads includes one or more pre-existing threads with prior messages and a new thread;
   indicate a classification of the message into at least one of the plurality of threads based on the set of probability values;

adjust classification of one or more of the prior messages based on the classification of the message;

perform a beam search to select a predetermined number of threads of classified messages; and prune threads excluded by the beam search to correct a classification of one or more messages in the pruned threads.

12. The computer program product of claim 11, wherein the plurality of machine learning models include long short-term memory models.

13. The computer program product of claim 11, wherein the program instructions to indicate a classification of the message further cause the computer to present one or more groupings of messages that each include messages classified into a same thread.

14. The computer program product of claim 11, wherein the message is classified in real time.

15. The computer program product of claim 11, wherein the contextual information included in the feature vector comprises one or more of: user identity differences between the message and one or more of the prior messages, and time differences between the message and one or more of the prior messages.

* * * * *